United States Patent [19]

Klinger et al.

[11] Patent Number: 4,809,179

[45] Date of Patent: Feb. 28, 1989

[54] CONTROL SYSTEM FOR MOTOR VEHICLE SUSPENSION UNIT

[75] Inventors: Gary M. Klinger, Canton; Thomas G. Reichenbach; Shunso F. Watanabe, both of Livonia, all of Mich.

[73] Assignee: Ford Motor Company, Dearborn, Mich.

[21] Appl. No.: 5,174

[22] Filed: Jan. 20, 1987

[51] Int. Cl.$^4$ .............................................. B60G 17/00
[52] U.S. Cl. ................................ 364/424.05; 280/707; 280/840
[58] Field of Search ................. 280/6 R, 6 H, 6.1, 1, 280/707, 708; 180/41; 364/424

[56] References Cited

U.S. PATENT DOCUMENTS

| | | |
|---|---|---|
| 375,759 | 1/1908 | Whitcomb . |
| 1,671,658 | 5/1928 | Travers . |
| 3,052,458 | 9/1962 | Schnitzer . |
| 3,603,612 | 9/1971 | Hill et al. ........................ 280/124 F |
| 3,606,365 | 9/1971 | Strong . |
| 3,866,724 | 2/1975 | Hollnagel ............................ 188/129 |
| 3,913,938 | 10/1975 | Arkawa et al. ................ 280/112 A |
| 3,990,542 | 11/1976 | Dent et al. ........................... 188/67 |
| 3,992,039 | 11/1976 | Hiruma ................................ 280/703 |
| 4,333,668 | 6/1982 | Hendrickson et al. ............. 280/703 |
| 4,364,574 | 12/1982 | Saito .................................... 280/6 R |
| 4,453,725 | 6/1984 | Kuwana et al. ..................... 280/6 R |
| 4,564,215 | 1/1986 | Kumagai et al. ................... 280/707 |
| 4,589,676 | 5/1986 | Meloche et al. ................ 280/714 X |
| 4,591,185 | 5/1986 | Natsume et al. .................... 280/707 |
| 4,595,072 | 6/1986 | Barnea ............................ 280/707 X |
| 4,602,805 | 7/1986 | Tanaka et al. .................. 280/707 X |
| 4,621,833 | 11/1986 | Soltis .............................. 280/DIG. 1 |
| 4,625,992 | 12/1986 | Tanaka et al. .................. 280/707 X |
| 4,652,010 | 3/1987 | Sugasawa ........................... 280/707 |
| 4,671,534 | 6/1987 | Yano .............................. 280/708 X |
| 4,696,489 | 9/1987 | Fujishiro et al. .................... 280/707 |
| 4,697,237 | 9/1987 | Tanaka et al. .................. 280/707 X |
| 4,714,271 | 12/1987 | Buma et al. ......................... 280/707 |
| 4,722,546 | 2/1988 | Asami et al. ....................... 280/707 |

OTHER PUBLICATIONS

John Douglas-Young, Illustrated Encyclopedia Dictionary of Electronics, (1981 Edition), p. 478, line 13.

Primary Examiner—Gary Chin
Attorney, Agent, or Firm—Jerome R. Drouillard; Roger L. May

[57] ABSTRACT

An operating system for an adjustable suspension unit having adjustable damping capability includes a suspension control unit which modulates the force imposed upon the body of the motor vehicle by adjusting the force developed by the suspension unit according to the particular stroke of the cycle in which the suspension unit is operating so that the suspension unit will exert a net force upon the body in a desired direction.

13 Claims, 6 Drawing Sheets

CONTROL SYSTEM FOR MOTOR VEHICLE SUSPENSION UNIT

BACKGROUND OF THE INVENTION

1. Field of the Invention

This invention relates to an adjustable motor vehicle suspension comprising an adjustable suspension unit and a control system therefor.

2. Disclosure Information

Adjustable suspension units, and particularly adjustable suspension units with adjustable damping capability have been the subject of numerous patents. For example, U.S. Pat. No. 3,603,612 discloses an adjustable shock absorber in which an electronic control valve is operable to change the damping capability of the unit as a function of vehicle speed.

Adjustable shock absorbers have been employed with a variety of control schemes. An example of one such control scheme is disclosed in U.S. Pat. No. 4,333,668 in which damping is controlled as a function, inter alia, as a function of body roll. For the purposes of this document, the term "body roll" refers to a potentially objectionable tilting or leaning of an automobile body from its normal ride attitude during turning, stopping, braking, or other maneuvers.

U.S. Pat. No. 4,564,215 discloses a control system in which a bistable suspension unit is switchable from a soft state to a hard state.

U.S. Pat. No. 4,589,676 discloses a control system which senses road undulations and changes the damping characteristics of the suspension unit accordingly. This device, as well as the previously described devices, includes hydraulic means for damping road-induced vibrations. Although such means may be satisfactory under certain conditions, hydraulic suspension units are generally incapable of achieving fast response in the 10 to 15 Hz. frequency regime which characterizes the vertical suspension motion of many modern motor vehicles.

U.S. Pat. Nos. 3,913,938; 3,992,039; 4,364,574; 4,453,725; and 4,591,185 each disclose a type of suspension system including vehicle height or level control capability. Each of these devices is either hydraulically or pneumatically actuated and each functions at a steady state to control the height of a vehicle body with respect to the balance of a suspension system. None of these systems is capable of controlling the suspension unit in the manner herein described while the suspension unit is oscillating at the natural frequency of the suspension system, which includes the suspension unit, the wheel and tire assembly, and any other dampers or spring elements.

U.S. Pat. No. 3,606,365 discloses an active suspension system for a vehicle in which the vehicle body is supported by a piston and cylinder arrangement. Oscillations of the body are counteracted by manipulating the volume of fluid on either side of the piston. This system, too, is not capable of high frequency response because of the lag time associated with the various valves and other hydraulic devices included in the system. Such hydraulic devices are generally incapable of accurately controlling a suspension system during a half cycle stroke because of a non-linear relationship between the force the hydraulic damper generates and the input control signals. This non-linearity results from the characteristics of the hydralic valves, from the compressibility of the hydralic fluid, and other factors, and makes it difficult to control damping force independent of damper velocity. Other problems with hydraulic dampers stem from the compressibility of the hydraulic fluid and from the fact that hydraulic dampers cannot easily generate high forces at low damper velocities. Such a capability is desirable for anti-dive, anti-squat, and anti-roll vehicle control. Yet another deficiency in hydraulic dampers resides in the fact that such devices typically exhibit high frictional losses due to hydraulic seals.

Designers have attempted various configurations for sliding friction dampers or shock absorbers. In fact, sliding friction dampers were known at the dawn of the automotive age. For example, U.S. Pat. No. 375,759 discloses a sliding frictoin shock absorber which is adjustable by means of either a wedge or a four bar link mechanism. Other types of sliding friction shock absorbers are shown in U.S. Pat. Nos. 1,671,658; 3,052,458; 3,866,724; and 3,990,542. French Pat. No. 1,143,703 discloses yet another type of sliding friction shock absorber. None of these designs is suitable for integration in an automotive suspension system wherein it is desired to control the damping of the shock absorber depending upon which stroke of the two stroke cycle the damping device, as well as the balance of the suspension in which the damping device is included, happens to be operating in. Each of these aforementioned sliding fricton shock absorbers suffers from a similar deficiency residing in the fact that there is no feedback of the force developed by the device. As a result, wear within the device cannot be accounted for except in a gross sense—i.e., by adjusting the unit when a loss of ride control is noted by the vehicle operator.

It is an object of the present invention to provide an adjustable motor vehicle suspension comprising an adjustable suspension unit and a control system therefor which will permit dynamic adjustment of the damping of the suspension unit depending upon which stroke of a two stroke cycle the suspension unit is operating in.

It is another object of the present invention to provide an adjustable motor vehicle suspension comprising a control system which will allow the vehicle suspension to counteract body roll during cornering, brake dive, and acceleration squat.

It is yet another object of the present invention to provide an adjustable motor vehicle suspension comprising a control system which will counteract vertical oscillations of the vehicle body in response to inputs from the suspension.

It is an advantage of the present suspension that the control system can be used to control sliding friction shock absorbers capable of producing maximum force at a relative suspension velocity of zero (i.e., when the velocity of one part of the suspension unit is zero with suspect to the other part of the same suspension unit.)

It is another advantage of the present suspension that the control system may be employed to control sliding friction shock absorbers or other types of adjustable suspension unit having lower lag time characteristics.

It is yet another advantage of the present invention that a suspension according to the present invention uses the resilient energy of the suspension system to counteract undesired movement of the vehicle body.

It is yet another advantage of the present invention that this suspension may be used to produce high damping force inputs to the vehicle body without requiring power input from a hydraulic pump or other high power absorbing device.

Other features, objects and advantages of the present invention will be discussed and disclosed in this Specification.

SUMMARY OF THE DISCLOSURE

A suspension system for a motor vehicle having a body and road wheels supporting said body, with said road wheels being connected to said body by said suspension system, comprises an adjustable suspension unit comprising a damping device and adjustment means for adjusting the damping force produced by said damping device in response to a control signal, sensor means for predicting acceleration of said vehicle, and a control system operatively connected to said adjustment means for controlling the damping of said adjustable suspension unit in response to a predicted acceleration signal from said sensorm eans so that said suspension unit will resist roll of said body resulting from said acceleration. Said control system comprises means for modulating the force imposed upon said body by said suspension unit by controlling the force developed by said damping device according to the particular stroke of the cycle in which said suspension unit is operating, so that said suspension unit will exert a net force upon said body in a direction tending to resist roll of said body in response to said acceleration.

The sensor means for predicting acceleration of the vehicle comprises a sensor activated by operation of a braking system associated with the vehicle, or a sensor activated by operation of a throttle mechanism operatively connected with a powerplant incorporated in the vehicle, or a sensor operatively connected with a steering system incorporated in the vehicle.

The sensor means for predicting acceleration of the vehicle may comprise an accelerometer as well.

Said control system comprises means for determining the particular stroke of the two-stroke cycle in which the suspension unit is operating and means for controlling the force produced by the suspension unit during any particular stroke of the suspension unit such that the suspension unit will, if located on that side of the body tending to move downward during body roll movement, apply a net force in an upward direction against the body, whereas in the event that the suspension is located on a side of the body tending to move upward during roll movement, the suspension unit will be controlled so as to apply a downwardly directed force against the body. The means for determining the particular stroke of the cycle in which the suspension unit in operating comprises means for sensing relative motion of at least a portion of the suspension unit with respect to the body of the vehicle. The means for determining the particular stroke of the cycle may alternatively comprise means for sensing relative motion between two elements of the suspension unit. The adjusting means may further comprise means for sensing the magnitude of the damping force developed by the suspension unit.

In a preferred embodiment, the present control system includes sensor means for detecting vertical motion of the vehicle body. This sensor means may comprise a radio frequency ranging device.

A control system according to the present invention modulates the force developed by the suspension unit according to the magnitude of the velocity of the vehicle's body with respect to a horizontal global reference plane. Alternatively, the force developed by the suspension unit may be modulated according to the rate of acceleration of the body with respect to the surface the vehicle is being operated upon.

A method for operating a suspension unit having adjustable damping capability includes the steps of detecting vertical motion of the vehicle body with respect to a horizonal global reference plane and adjusting the force developed by the suspension unit according to the particular stroke in which the suspension unit is operating, so that the suspension unit will exert a net force upon the body in a direction tending to resist vertical motion of the body. According to this method, the suspension unit is preferably controlled so that it will apply a downwardly directed force against the body when the body is moving in an upward direction, and an upwardly directed force against the body when the body is moving in a downward direction. The force developed by the suspension unit is preferably controlled so that this force is proportional to the vertical velocity of the body with respect to the surface upon which the vehicle is being operated.

According to the method described herein, the suspension unit is preferably operated so that when a downwradly directed force against the body is required, the suspension unit will be adjusted to produce a greater amount of force when a road wheel and tire assembly opeatively associated with the suspension unit is moving in a direction away from the body of the vehicle and a lesser amount of force when the road wheel and tire assembly is moving in a direction toward the body of the vehicle. On the other hand, when it is desired to apply an upwardly directed force againt the body, the suspension unit will be adjusted so as to produce a lesser amount of force when the road wheel and tire assembly operatively associated with the suspension unit is moving in a direction away from the body of the vehicle and a greater amount of force when the road wheel and tire assembly is moving in a direction toward the body of the vehicle.

The disclosed method for operating an adjustable suspension unit described steps for operating the unit including the steps of determining the particular stroke of the two-stroke cycle in which the suspension unit is operating and adjusting the force developed by the suspension unit according to the particular stroke of the cycle in which the suspension unit is operating, so that the suspension unit will exert a net force upon the vehicle body in a desired direction.

DESCRIPTION OF THE PREFERRED EMBODIMENTS

Figure 1:
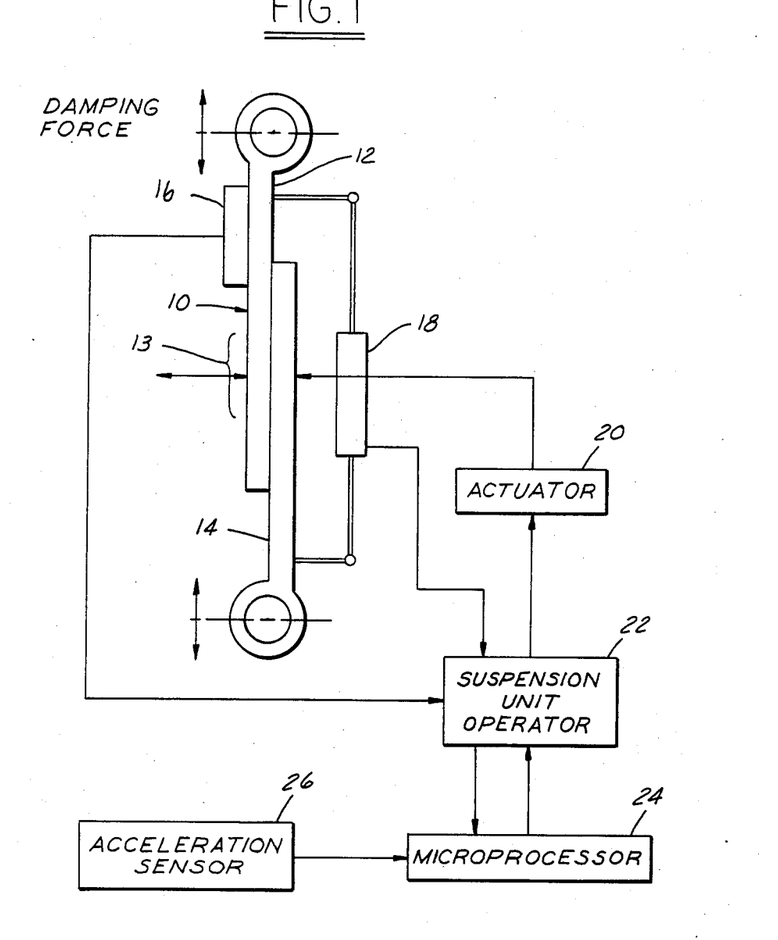
FIG. 1 is a schematic of an adjustable suspension unit and control system suitable for use together according to the present invention.
Figure 2:
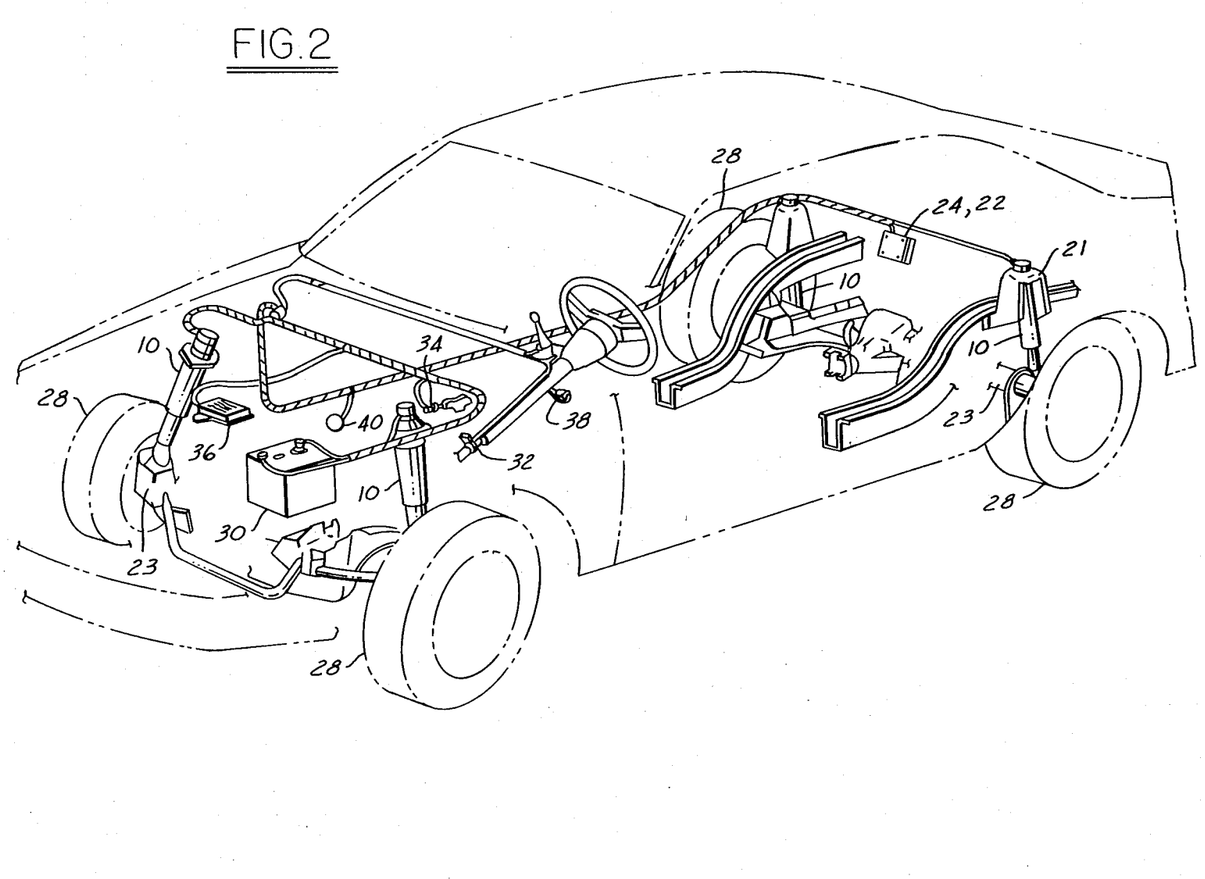
FIG. 2 is a perspective drawings of a motor vehicle incorporating the present system. This figure shows the various components of a system embodying the present invention.

As shown in FIGS. 1 and 2, a control system according to the present invention is intended for use with an adjustable suspension unit having adjustable damping capability and used in an automotive vehicle. Those skilled in the art will appreciate in view of this disclosure that the present system could be employed with any wheeled land vehicle. As shown particularly in FIG. 1, adjustable suspension unit 10 comprises a portion 12 which is to be attached to a vehicle body and a portion 14 attached to a portion of the suspension which is more closely connected with the wheel and tire assembly. As shown in FIG. 1, damping section 13 lies between portions 12 and 14 of adjustable suspension unit 10. Damping section 13 preferably comprises a sliding friction damping device such as those shown in FIGS. 3, 4, 5, 6 and 7, or may preferably comprise a hydraulic adjustable damping unit or other type of adjustable damping unit. Force sensor 16 is attached to portion 12 of the adjustable damping unit 10. The force sensor may comprise a piezoelectric device or load cell, or other types of force sensors known to those skilled in the art and suggested by this disclosure. Those skilled in the art will appreciate in view of this disclosure that other locations may be employed for mounting the force sensor. In any event, the purpose of the force sensor is to measure the amount of damping force developed by adjustable suspension unit 10 and to transmit this information to the microprocessor and to the suspension unit operator.

The movement of portions 12 and 14 of adjustable suspension unit 10 with respect to each other is detected by motion sensor 18. This sensor may be constructed according to the several methods known to those skilled in the art and suggested by this disclosure. For example, the sensor may comprise a Hall Effect sensor such as those currently employed in some automotive vehicles, or the sensor may preferably comprise a linear variable differential transformer (LVDT), or other types of sensors known to those skilled in the art and suggested by this disclosure. In any event, motion sensor 18 furnishes the present control system with information regarding the motion of the two portions of adjustable suspension unit 10 with respect to each other. This information tells the control system at any given instance whether the adjustable suspension unit is moving in a jounch direction, i.e., in a direction wherein its length is decreasing, or in a rebound direction, i.e., in a direction wherein its length is increasing. Sensor 18 also discloses to the control system the precise position of suspension unit 10 in term of its fully-extended, full-contracted states. This information is important because the present control system is intended to control the damping force generated by adjustable suspension unit 10 according to the particular stroke of the cycle in which the adjustable suspension unit is operating.

For the purposes of this document, adjustable suspension unit 10 is considered to operate in a cycle. The cycle has two strokes. The first stroke, herein referred to as a rebound stroke, describes the motion of the adjustable suspension unit when its length is increasing. The second stroke, herein referred to as the jounce stroke, describes the motion of the adjustable suspension unit when its length is decreasing. It is understood that the adjustable suspension unit is attached at one end to one or more wheel and tire assemblies shown at 28 in FIG. 2 as well as being attached to the body of the vehicle at the other end of the suspension unit.

As further shown in FIG. 1, a system according to the present invention may comprise actuator 20, suspension unit operator 22, microprocessor 24, and acceleration sensor 26.

Actuator 20 functions to control the force developed by adjustable suspension unit 10. In the case of the suspension units described herein, this control results from the adjustment, by the actuator, of a sliding friction element contained within the adjustable suspension unit. Two types of sliding friction elements are shown in FIGS. 4-7 herein.

Suspension unit operator 22 receives inputs from force sensor 16, motion sensor 18 and microprocessor 24.

Microprocessor 24 outputs to suspension unit operator 22 a desired force signal. Suspension operator 22, knowing the measured force being generated by the adjustable suspension unit at any time by virtue of the signals from force sensor 16, then outputs the signal to actuator 20 to direct the actuator to adjust the damping force produced by adjustable suspension unit 10.

Microprocessor 24 may receive various inputs from acceleration sensor 26. For example, acceleration sensor 26 may be arranged to provide an input to microprocessor 24 relating to turning of the vehicle, or brake operation of the vehicle, or operation of the vehicle throttle, or vertical motion of the vehicle, or other inputs. Those skilled in the art will appreciate in view of this disclosure, therefore, that acceleration sensor 26 could comprise a variety of sensors such as an accelerometer, a brake sensor such as a pressure sensor or electronic switch associated with the brake system of the vehicle, or other types of sensor such as a throttle position sensor included in a throttle mechanism operatively connected with the vehicle power plant. The steering sensor and associated control system disclosed in U.S. Pat. No. 4,621,833, which is hereby incorporated by reference herein, comprises yet another type of sensor useful for predicting lateral acceleration in a vehicle Those skilled in the art will appreciate in view of this disclosure that microprocessor 24 and its peripheral equipment could be structured according to several different architectures. In a preferred embodiment, however, microprocessor 24 is configured so that a control program is sequentially read for each unit command from a read-only memory (ROM) which stores preset control programs. Unit commands are executed by a central processing unit (CPU). The microprocessor integrally includes an input-output control circuit (I/O) for exchanging data with external devices and a random access memory (RAM) for temporarily holding data while the data are being processed.

As shown in FIG. 2, a vehicle including body 21 and four wheel and tire assemblies 28 has adjustable suspension units 10 mounted generally between the wheel and tire assemblies and the vehicle body. A MacPherson strut suspension is illustrated at the front of the vehicle, whereas a Hotchkiss drive is shown at the rear. Those sklled in the art will appreciate in view of this disclosure, however, that an adjustable suspension unit and control system according to the present invention could be employed with a vehicle in a variety of suspension configurations, it being understood that those shown in FIG. 2 are merely exemplary of the class of suspensions useful for practicing the present invention.

FIG. 2 shows microprocessor 24 mounted in the rear of the vehicle. The microprocessor enclosure also includes suspension unit operator 22. Those skilled in the art will appreciate in view of this disclosure however, that microprocessor 24 and suspension unit operator 22 could be integrated with an engine control computer, or any other type of on-board computer system within the vehicle. Moreover, multiple suspension unit operators may be employed so as to independently control each suspension unit with a unique operator.

As shown in FIG. 2, wheel and tire assemblies 28 are connected by means of suspensions 23 to adjustable suspension units 10. Although four adjustable suspension units are shown on the vehicle in FIG. 2, it will be appreciated in view of this disclosure that adjustable units could be used at fewer than four locations in the vehicle. For example, if it is determined that a particular vehicle is particularly prone to fore and aft pitching, but not to roll during cornering, it may be desirable to equip the vehicle with adjustable suspension units at only the front or the rear of the vehicle.

The system shown in FIG. 2 is powered by the vehicle's battery, 30. As previously, a plurality of sensors is employed to provide the system with information it needs in order to operate adjustable suspension units 10. Accordingly, steering sensor 32 is shown. This sensor functions as described in U.S. Pat. No. 4,621,833 which was previously incorporated by reference into this document. Brake sensor 34 is also shown, as is speed sensor 38. The brake, speed, and steering sensors may all be used for the purpose of detecting acceleration of the vehicle. For example, speed sensor 38 detects vehicle speed and the data therefrom may be manipulated by microprocessor 24 to calculate vehicle velocity and acceleration. Brake sensor 34 detects operation of the vehicle's brake system and therefore will detect linear acceleration (or deceleration) of the vehicle due to application of the brakes. Throttle position sensor 40 may also be used to detect acceleration because application of the throttle will normally cause the vehicle's speed to increase. Steering sensor 32 may be used to predict lateral acceleration of the vehicle, because movement of the steering wheel will almost always precede the lateral acceleration occasioned by a subsequent turn.

A single accelerometer, 36, is shown as being mounted in the front of the vehicle in the approximate vicinity of the engine compartment. It should be understood that multiple accelerometers could be employed according to the present invention with one or more accelerometers at the front of the vehicle and one or more accelerometers at the rear of the vehicle. If desired, an accelerometer could be positioned adjacent to each adjustable suspension unit 10. Alternatively, sensors could be deployed at the right and left sides (i.e., on the passenger and driver sides of the vehicle) to allow detection of body roll. It will be appreciated in view of this disclosure that the previously described accelerometers could be employed to detect acceleration in several mutually perpendicular planes such as laterally, longitudinally, or vertically.

Figure 3:
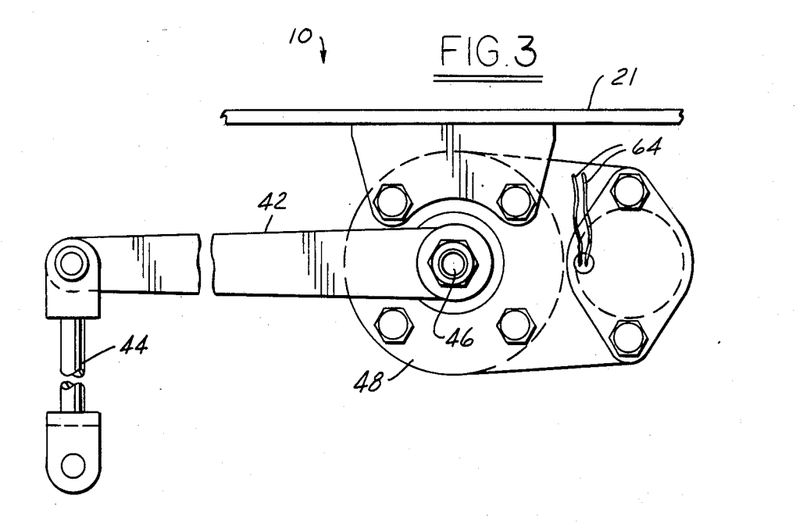
FIG. 3 is an elevation of an adjustable suspension unit suitable for use with the present invention.
Figure 4:
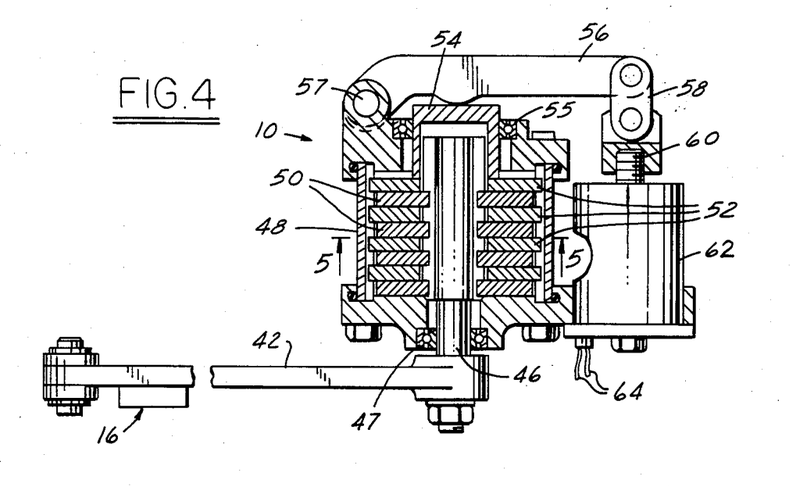
FIG. 4 is a partially cut-away view of the suspesnion unit shown in FIG. 3.
Figures 5, 6, 7:
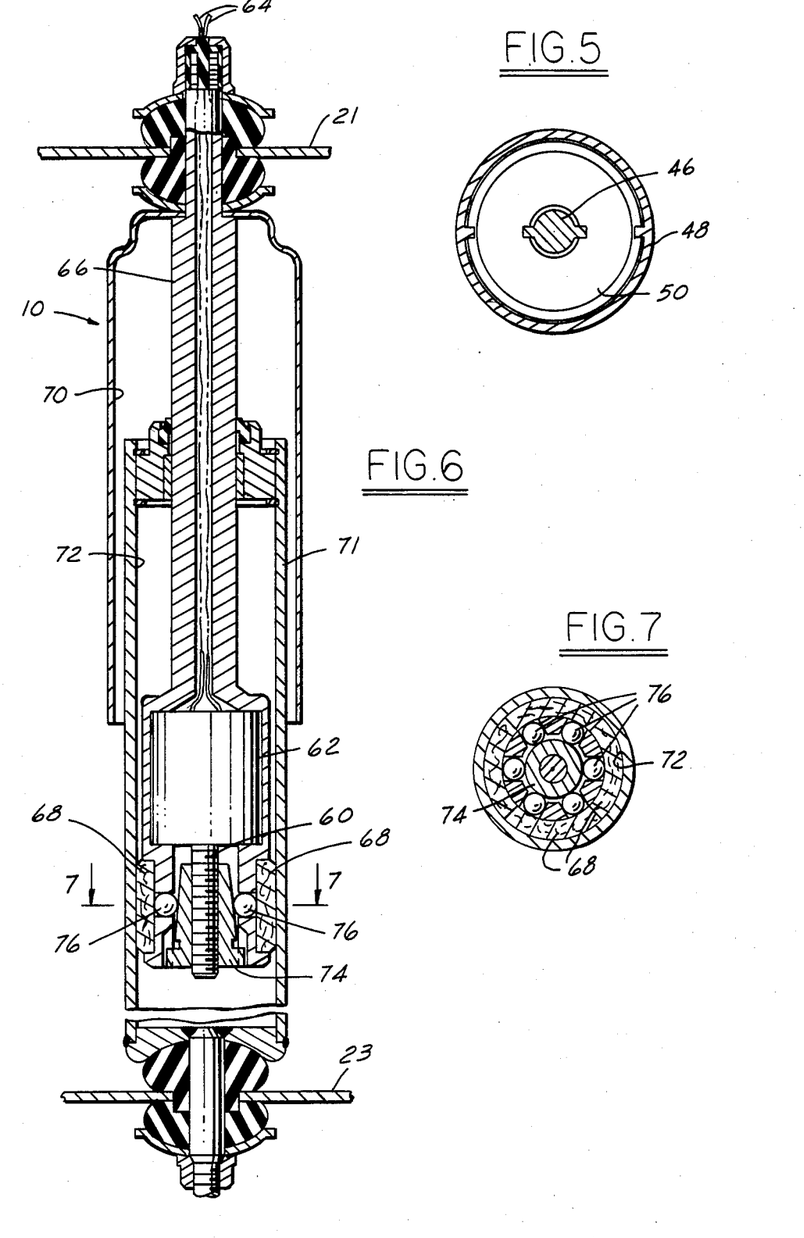
FIG. 5 is a partial cross section of the suspension unit shown in FIG. 4, taken along the line 5—5 of FIG. 4.
FIG. 6 is a cross sectional view of a second type of adjustable damper suitable for use according to the present invention.
FIG. 7 is a cross sectional view of the damper shown in FIG. 6, taken along the line 7—7 of FIG. 6.

As shown in FIGS. 3–5, one type of adjustable suspension unit suitable for use according to the present invention is of the rotary type. Although rotary friction dampers were used in automobiles many years ago, such dampers were unreliable because the force characteristics of the damper could not be regulated accurately. As a result, the damping characteristics were unreliable. As shown in FIG. 3, adjustable suspension unit 10 is mounted to body 21 of the vehicle. Housing 48 of the adjustable suspension unit is attached to the body by means of a bracket or other conventional attaching techniques known to those skilled in the art. Adjustable suspension unit 10 is connected to the balance of the suspension according to any of several well known constructions by means of link 44 which is attached to pitman arm 42. The pitman arm is rigidly attached to rotatable shaft 46 which is pivoted within housing 48. For this purpose, bearing 47 is provided at one end of rotatable shaft 46. The opposite end of rotatable shaft 46 is pivoted within plunger 54 (See FIG. 4). Rotatable shaft 46 has a plurality of rotors 50 keyed thereto. FIG. 5 shows rotors 50 and this keying feature in greater detail. Rotors 50 rotate with rotatable shaft 46 as rotatable shaft 46 is driven by pitman arm 42, link 44 and the balance of the suspension attached to these components.

A plurality of stators 52 is interleaved with rotors 50. Stator plates 52 are non-rotatably mounted within outer housing 48. Stator plates 52 are urged to clampingly engage rotor plates 50 by plunger 54 so that rotation of rotatable shaft 46 and rotor plates 50 is thereby resisted. As a result, adjustable suspension unit 10 resists jounce and rebound motion of the suspension transmitted by link 44 to pitman arm 42. The measured amount of resistance to suspension motion (damping force) is fed into suspension unit operator 22 by means of force sensor 16.

The amount of damping force developed by suspension unit 10 shown in FIG. 4 is controlled by plunger 54 in conjunction with crosslink 56, toggle link 58, lead screw 60, and torque motor 62. Plunger 54 presses axially upon the interleaved stator and rotor plates so as to develop a normal force between the stator and rotor plates. Accordingly, the amount of friction acting between the rotor and stator plates and the resultant damping force developed by the suspension unit is controlled. Plunger 54 is loaded into the stator and rotor plate stack by means of crosslink 56, which is pivoted to outer housing 48 by means of crosslink pivot 57. Crosslink 56 is connected to a driving mechanism comprising lead screw 60 and torque motor 62 by means of toggle link 58. Toggle link 58 has a pivot at either end allowing lead screw 60 and torque motor 62 to move the crosslink 56 in an out so as to either clamp tighter or more loosely plunger 54 and thereby, the statort and rotor stack. Lead screw 60 and torque motor 62 advantageously control the adjustable suspension unit because only very small displacements of plunger 54 are needed to change the frictional force developed between the stator and rotor plates. This allows very high amplification of the actuator force with minimum actuator displacement. Thus, a small torque motor and lead screw assembly may be used while at the same time maintaining a high frequency response. Accordingly, the relationship between the force developed by the adjustable suspension unit and the electrical control signal is linear. The damping force developed by the adjustable suspension is therefore linearly related to the sliding frictional force through the coefficient of friction. Because the motor torque produced by the torque motor for small displacements is linearly proportional to the input current, the force produced by the damper is proportional to the current driving the motor. As a result, the frequency response of the suspension unit is limited primarily by the speed with which the current can be changed in the motor. Because this current can be changed very rapidly a suspension unit according to the principles described herein can have very fast response characteristics. In addition, the damping force developed by a suspension unit operated according to the principles described herein is independent of velocity of the suspension unit's motion in the jounce and rebound directions. A damper operated according to the present scheme can generate its maximum force at zero suspension velocity or at maximum suspension velocity or at any intermediate velocity. Because the damping is adjustable, moreover, the damper can be manipulated to provide zero damping if required.

A second embodiment of a damper useful for practicing the present invention is shown in FIGS. 6 and 7. In this embodiment, piston rod 66 is attached to vehicle body 21. The lower end of suspension unit 10, including cylindrical tube 71, is attached to suspension 23 of the vehicle. Thus, as the suspension and attached wheel and tire assembly 28 moves through the jounce and rebound strokes, adjustable suspension unit 10 will be caused to contract and expand in legnth. This contraction and expansion in length is accompanied by the sliding of a plurality of semi-circular segments 68 upon inner surface 72 of cylindrical tube 71. This sliding motion of semi-circular segments 68 dissipates energy in the manner of the rotational sliding of the rotors and stators of the previous embodiment.

Semi-circular segments 68 are maintained in contact with the inner surface 72 of cylindrical tube 71 by means of wedge 74, shown in FIGS. 6 and 7. Wedge 74 is preloaded into semi-circular segments 68 with the assistance of a plurality of bearings 76 which are interposed between the semi-circular segments and wedge 74. Wedge 74 is driven by lead screw 60 which is operatively attached to torque motor 62. Lead screw 60 is rotated by torque motor 62 and the threads of the lead screw, which mate with threads formed upon an inner surface of the wedge, cause the wedge to be positioned more tightly or less tightly against bearings 76 as the lead screw is rotated. As a result, semi-circular segments 68 are caused to be positioned so as to develop greater or lesser amounts of force between the semi-circular segments and the inner surface 72 of cylindrical tube 70. In this manner, the damping force produced by the adjustable suspension unit is adjustable. Torque motor 62 is operated by means of electrical leads 64 which pass out of the adjustable suspension unit through one end of piston rod 66 and connect with suspension operator 22.

Those skilled in the art will appreciate in view of this disclosure that other types of motors could be employed for the purpose of operating a shock absorber according to the present invention. For example, other types of hydraulic or electrical motors or other mechanical or electromechanical or hydraulic devices could be employed for the purpose of changing damping in the manner described herein. Further, those skilled in the art will appreciate in view of this disclosure that hydraulic or pneumatic damping devices could be employed according to the present invention, provided such hyraulic and pneumatic devices possess sufficient response characteristics in order to be compatible with the present system.

As noted previously, a control system according to the description herein may be operated to either elimi-
nate completely or reduce objectionable roll motion and other undesirable motions of a vehicle body. Such motions are encountered, for example, when the vehicle body "rolls over" during cornering. In this context, the term "roll over" does not mean literally that the vehicle wheels leave the ground and vehicle rolls upon its side or roof, but rather "roll over" means, in the traditional automotive sense, that the body is caused, for a moment, to leave its normal riding attitude and to objectionably lift up on one side or the other. This objectionable body motion may also occur during braking operation, which is frequently accompanied by lifting of the rear end of the vehicle and lowering the front of the vehicle. Acceleration, on the other hand, may produce an objectionable lowering of the rear end of the vehicle and raising of the front end of the vehicle. The final type of objectionable motion which the present invention is intended to either reduce or eliminate, is vertical oscillation of the body as a result of road surface inputs.

It has been found that the wheel and tire assemblies of a vehicle traversing a flat, level, and nominally smooth roadway will oscillate vertically (i.e., in the jounce and rebound directions) at a frequency of approximately 13 Hz. This oscillation of the wheel and tire assemblies will occur no matter how smooth the road surface apperas to an unaided eye. The vehicle body, on the other hand, has a natural frequency of vibration of approximately 1.4 Hz, falling in a range of observed natural frequencies running from approximately 0.9 Hz to 1.8 Hz. Because the natural frequency of the body is approximately one order of magntiude less than the frequency of oscillation of the wheel and tire assemblies, the present invention can be used to impart some of the energy available in the oscillating wheel and tire assemblies to control the attitude of the body without causing the body to vibrate excessively. Accordingly, "pump-up" and "pump-down" routines are disclosed for controlling the attitude of the vehicle body by means of the present invention. As previously noted, the suspension of a vehicle described herein, including an adjustable suspension unit having variable damping capability, operates in a cycle comprising jounce and rebound strokes. Accordingly, if it is desired to raise that portion of the vehicle's body attached to a given suspension unit, the suspension unit will be controlled so that the suspension unit is set to achieve a greater degree of damping when the wheel and tire assembly and its associated suspension unit are moving in the jounce direction, whereas the suspension unit will be adjusted to achieve a lesser degree of damping when the wheel and tire assembly and associated suspension components are moving in the rebound direction. This is called "pump-up". Conversely, "pump-down" occurs when it is desired to move either the entire body, or only one side or end thereof in a downward, or, to apply a downwardly directed force to the body. In the case of pump-down operation, the adjustable suspension unit will be set to provide a lesser degree of damping when the suspension unit and wheel and tire assemlby and the remainder of the suspension are moving in the jounce direction, but the suspension unit will be adjusted to provide maximum or at least a greater degree of damping when the wheel and tire assembly and suspension unit and the remainder of the suspension are moving in the rebound direction.

Figure 8:
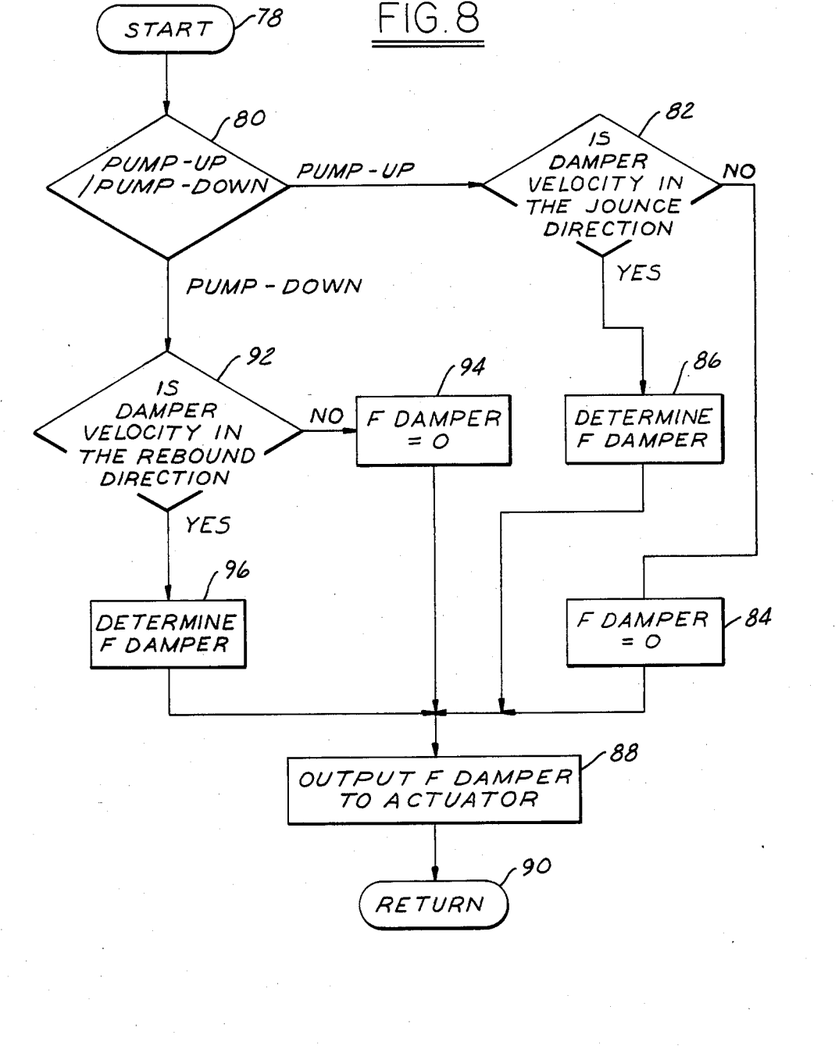
FIG. 8 is a logic flow block diagram in accordance with an embodiment of this invention.

Referring now to FIG. 8, a simplified logic flow diagram for the operation of the control system of the present invention is shown. After block 78, the start of the pump-up/pump-down routine, the computer transfers to block 80 wherein it asks whether pump-up or pump-down is required by microprocessor 24.

In the event that pump-up is required the computer transfers to block 82 wherein the velocity of suspension unit 10 in either the jounce or rebound directions is determined. In the event that the suspension unit 10 is moving in the rebound direction, the computer transfers to block 84 and sets the force output command to suspension unit operator 22 at a zero or near zero level. In the event, however, that suspension unit 10 is moving in the jounce direction, the computer transfers to block 86 and determines an appropriate force to be developed by the damper. The desired force output information is transferred at block 88 to actuator assembly 20 via suspension unit operator 22. The computer then returns at block 90 to start block 78. In similar fashion, in the event that a pump-down is being requested by microprocessor 24, the computer transfers at block 80 to block 92 wherein a question is asked about the velocity of suspension unit 10. In the event that suspension unit 10 is moving in the jounce direction, the force of the damper at block 94 is set at zero or near zero, and an appropriate force command is then output to actuator 20 via suspension operator 22 at block 88. In the event, however, that suspension unit 10 is moving in the rebound direction, the computer will, at block 96, set the damper force at some value greater than zero and a signal corresponding to this value will be outputted to actuator 20 via suspension unit operator 22 at block 88.

In the event that a vehicle equipped with the system described herein is turned in either the right or left directions, steering sensor 32 and associated software will detect incipient lateral acceleration. If, for example the vehicle is making a left turn, which would normally cause the body to roll over to the right, the adjustable suspension units on the right side of the vehicle will be given a pump-up command, while the units on the left side of the vehicle will be given a pump-down command. Operaton of the adjustable suspension units in this manner will counteract the roll of the body. In this example, the suspension units are controlled in response to detected incipient lateral acceleration. In similar fashion, should the driver of the vehicle apply the brakes, the suspension unit in the front of the vehicle can be given a pump-up command while those in the rear are given a pump-down command. Once again, this operation of the adjustable suspension units will tend to maintain the body at a level attitude. In this example, the suspension units are controlled in response to either incipient linear acceleration, or actual linear acceleration. Accordingly, the method and system described in FIG. 8 comprises means for detecting vertical motion of the body with respect to a horizontal global reference plane and adjusting the force developed by the suspension units according to the particular stroke of the cycle which each suspension unit is operating, so that the suspension units will assert a net force upon the body in the direction tending to resist vertical motion of the body. In this manner, the force imposed upon the vehicle's body by the suspension unit is modulated according to the particular stroke the suspension unit is operating in, so that the suspension unit will exert a net force upon the vehicle's body in the desired direction, either upwardly or downwardly. The suspension unit thus exerts a net force upon the vehicle's body in only one direction, because although the individual forces exerted by the suspension unit in the jounce and rebound directions will to tend to cancel each other, these forces will not be equal, and as a consequence, the sum of the forces will have an absolute value greater than zero.

It has been found that setting the magnitude of the force developed by the adjustable suspension unit proportional to the vertical velocity of the body with respect to a horizontal global reference plane produces an acceptable vehicle ride characteristic. This has been implemented in a "sky hook" method.

Figure 9:
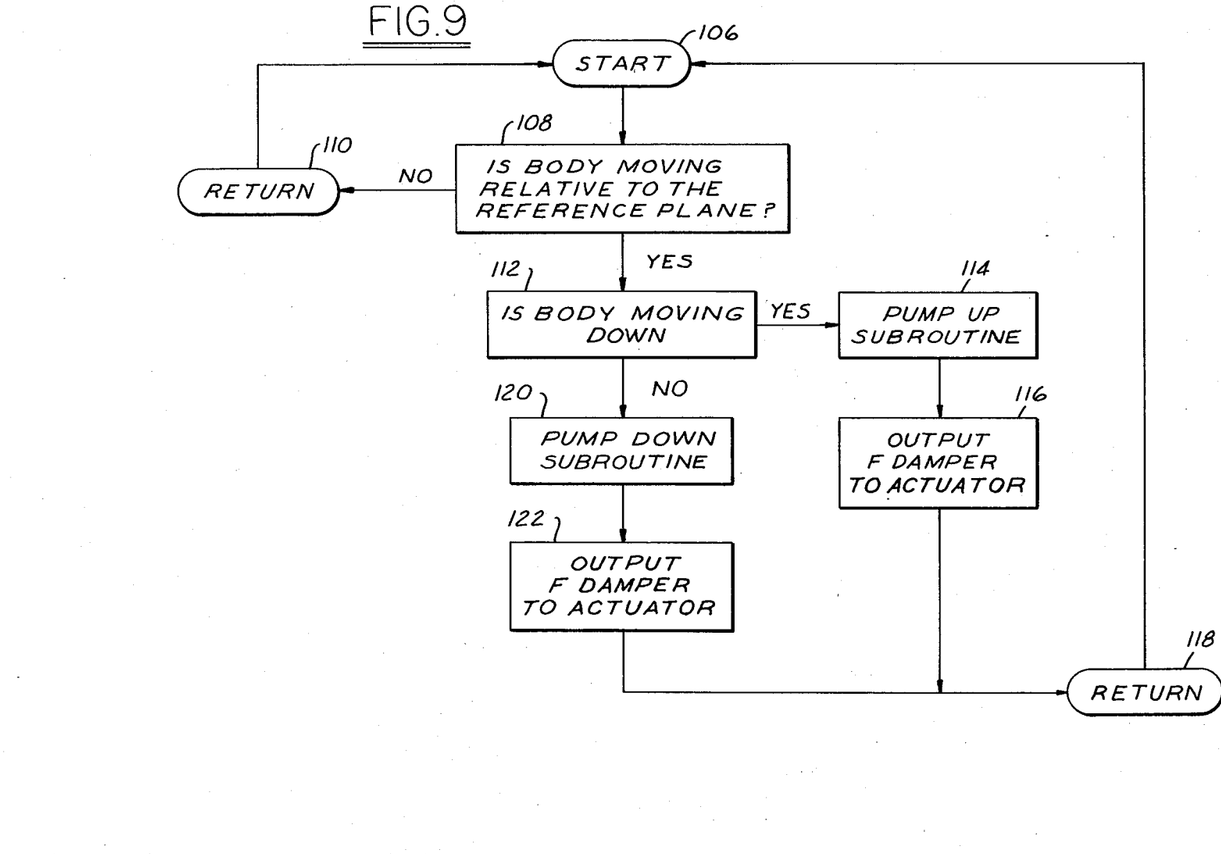
FIG. 9 is a second logic flow block diagram in accordance with an embodiment of this invention.

FIG. 9 discloses a sky hook method for operation of a system according to the present invention. Beginning at block 106, the start block, the computer transfers to block 108 wherein the computer ascertains with the help of the previously described sensors, whether the vehicle's body is moving relative to a horizontal reference plane. For this purpose, the sensor may include an accelerometer, or a high frequency ranging device such as a laser device, a radar, a microwave device, or other known devices. In the event that the body is not moving vertically above a predetermined threshold velocity the computer returns at block 110 to the start block. In the event, however, that the body is moving above a threshold velocity in a veritcal direction, the computer ask at block 112 whether the body is moving down. In the event that the body is moving down, the pump-up subroutine is selected at block 114. This subroutine may be precisely that shown for pump-up in FIG. 8, or a modified form of the subroutine. In any event, however, output of the adjustable suspension unit desired damping force signal to actuator 20 at block 116 is done as before. Having done this, the computer transfer to block 118 to the start block. In the event that the body is moving up, the computer initiates the pump-down subroutine at block 120 and outputs a new force signal to the actuator at block 122. In this manner, the vehicle body can be maintained at a level attitude, and the vehicle will be allowed to drive down a road without having unnecessarily harsh vertical body motion due either to inputs from the wheel and tire assemblies or from road surface imperfections. In any event, the magntiude of the desired damping force is calculated by the computer in the following manner. First, the computer integrates signals from the accelerometer or accelerometers in order to calculate the vehicle's veritcal velocity. This calculated velocity is then transformed into a desired damping force signal.

The present invention provides a beneficial system and method for operating a suspension unit having adjustable damping capability because the present system is able to determine the particular stroke of the cycle which the suspension unit is operating, and the system is further able to both measure and to adjust the force developed by the suspension unit according to the stroke the unit is operating in so that the suspension unit will exert a net force upon the vehicle body in a desired direction.

As used herein, the term "body" refers to a conventional automotive body, or to a conventional automotive body and chassis combination.

Various modifications and variations will no doubt occur to those skilled in the various arts to which this invention pertains. For example, the particular sensors used in conjunction with the disclosed system may be varied from those disclosed within. Further, the suspension unit may comprise active or passive hydraulic, pneumatic, or electrical units in addition to those disclosed herein. These and all variations which basically rely on the teachings through which this disclosure has advanced the art are properly considered within the scope of this invention as defined by the appended claims.

We claim:

1. A suspension system for a motor vehicle having a body and road wheels supporting said body, with said road wheels being connected to said body on said suspension system, said suspension system comprising:
   an adjustable suspension unit comprising a damping device and adjustment means for adjusting the damping force produced by said damping device in response to a control signal;
   sensor means for predicting acceleration of said vehicle; and
   a control system operatively connected to said adjustment means for producing said control signal for controlling the damping of said adjustable suspension unit in response to a predicted acceleration signal from said sensor means so that said suspension unit will resist roll of said body resulting from said acceleration, said control system comprising
   means for determining a particular stroke of the cycle in which said suspension unit is operating; and
   means for controlling the force produced by said suspension unit during any particular stroke of said suspension unit such that said suspension unit will, if located on that side of said body tending to move downward during a roll movement, apply a net force in an upward direction against said body, whereas in the event that said suspension unit is located on that side of said body tending to move upward during said roll movement, said suspension unit will be controlled so as to apply a downwardly directed force against said body.

2. A suspension system according to claim 1 wherein said sensor means for predicting acceleration of said vehicle comprises a sensor activated by operation of a braking system associated with said vehicle.

3. A suspension system according to claim 1 wherein said sensor means for predicting acceleration of said vehicle comprises a sensor activated by operation of a throttle mechanism operatively connected with a powerplant incorporated in said vehicle.

4. A suspension system according to claim 1 wherein said sensor means for predicitng acceleration of said vehicle comprises a sensor operatively connected with a steering system incorporated in said vehicle.

5. A suspension system according to claim 1 wherein said sensor means for predicting acceleration of said vehicle comprises an accelerometer.

6. A suspension system according to claim 1 further comprising means for measuring the magnitiude of the damping force developed by said suspension unit.

7. A suspension system according to claim 1 wherein said means for determining the particular stroke of the cycle in which said suspension unit is operating comprises means for sensing relative motion of at least a portion of said suspension unit with respect to the body of said vehicle.

8. A suspension system according to claim 1 wherein said means for determining the particular stroke of the cycle in which said suspension unit is operating comprises means for sensing relative motion between two elements of said suspension unit.

9. A method for operating a motor vehicle suspension unit having adjustable damping capability, where said vehicle has a body supported by road wheels connected to said body by said suspension unit, said method comprising the steps of:
   detecting vertical motion of said body with respect to a horiziontal global reference plane;
   directly measuring the magnitude of the force developed by said suspension unit by a load cell; and
   adjusting the magnitude of the force developed by said suspension unit according to the particular stroke of the cycle in which said suspenion unit is operating, so that said suspension unit will exert a net force upon said body in a direction tending to resist the detected vertical motion of said body.

10. A method according to claim 9 wherein said suspension unit is controlled such that when said body is moving in an upward direction said suspension unit will apply a downwardly directed net force against said body, whereas when said body is moving in a downward direction said suspension unit will appply an upwardly directed net force against said body.

11. A method according to claim 9 wherein the force developed by said suspension unit is proportional to the vertical velocity of said body with respect to a horizontal global reference plane.

12. A method according to claim 10 wherein said suspension unit is operated so as to apply a downwardly directed force against said body by adjusting said suspension unit to produce a greater amount of force when a road wheel and tire assembly operatively associated with said suspension unit is moving in a direction away from the body of said vehicle and a lesser amount of force when said road wheel and tire are moving in a direction toward the body of said vehicle.

13. A method according to claim 10 wherein said suspension unit is operated so as to apply an upwardly directed force against said body by adjusting said suspension unit to produce a lesser amount of force when a road wheel and tire assembly opearatively associated with said suspension unit is moving in a direction away from the body of said vehicle and a greater amount of force when said road wheel and tire assembly is moving in a direction toward the body of said vehicle.

* * * * *

UNITED STATES PATENT AND TRADEMARK OFFICE
CERTIFICATE OF CORRECTION

PATENT NO. : 4,809,179
DATED : February 28, 1989
INVENTOR(S) : Gary M. Klingler et al It is certified that error appears in the above-identified patent and that said Letters Patent is hereby corrected as shown below:

On the title page

The spelling of the first inventor's name listed on the patent is changed to read: --Gary M. Klingler--.

Signed and Sealed this

Twenty-ninth Day of August, 1989

Attest:

DONALD J. QUIGG

*Attesting Officer*　　　　*Commissioner of Patents and Trademarks*